United States Patent [19]

Miksitz

[11] E Re. 29,385

[45] Reissued Sept. 6, 1977

[54] GRAVITY DISCHARGE APPARATUS

[75] Inventor: Frank J. Miksitz, Phillipsburg, N.J.

[73] Assignee: Universal Feeders, Inc., Bethlehem, Pa.

[21] Appl. No.: 684,192

[22] Filed: May 7, 1976

Related U.S. Patent Documents

Reissue of:

[64] Patent No.: 3,809,286
Issued: May 7, 1974
Appl. No.: 216,105
Filed: Jan. 7, 1972

[51] Int. Cl.[2] ..... B65G 65/70

[52] U.S. Cl. ..... 222/1; 222/185; 222/199; 222/404

[58] Field of Search ..... 222/1, 404, 410, 411, 222/185, 198-200; 214/17 D; 34/168

[56] References Cited

U.S. PATENT DOCUMENTS

| | | | |
|---|---|---|---|
| 1,200,866 | 10/1916 | Ramsay | 222/199 |
| 2,110,111 | 3/1938 | Norquist | 222/199 X |
| 2,153,030 | 4/1939 | Venable | 222/199 |
| 3,117,697 | 1/1964 | Watson | 222/185 |
| 3,261,508 | 7/1966 | Wahl | 222/199 |
| 3,403,895 | 10/1968 | Hatfield et al. | 34/168 |

*Primary Examiner*—Robert B. Reeves
*Assistant Examiner*—John P. Shannon
*Attorney, Agent, or Firm*—Cushman, Darby & Cushman

[57] ABSTRACT

Apparatus and method for conveying granular material by gravity assist from an upper zone and a lower zone by means of a horizontal annular plate which is disposed between the two zones, the plate being orbited in a horizontal plane below a fixed shroud so that the material flows downwardly through the aperture in the plate along a path which moves in a horizontal plane around the periphery of the aperture.

15 Claims, 8 Drawing Figures

GRAVITY DISCHARGE APPARATUS

Matter enclosed in heavy brackets [ ] appears in the original patent but forms no part of this reissue specification; matter printed in italics indicates the additions made by reissue.

This invention relates to gravity assisted flow of granular materials from storage containers or from storage piles, and in particular to discharge and feeding devices for maintaining controlled flow of granular materials from the storage container or pile into another container, a reaction zone or a process line. By granular material is meant any material, fine, coarse or chunk, which is capable of pouring through an aperture. It has long been recognized that certain types of granular material are difficult to discharge in a uniform or controlled manner from a hopper or storage pile under the influence of gravity. These so-called nonfreeflowing granular materials in bulk form are characterized by various internal forces in the bed, caused by such properties as cohesion and the size and shape of the granules, which are capable of producing piping, funneling and arching of the material. Piping or funneling is the formation of a generally vertical passage through the mass of material caused by flow of a core of the material out of the discharge opening while the remainder of the material in the hopper remains more or less stationary. Arching is the formation of dome-like pockets within the material above the point of discharge.

The art also recognizes that when a granular solid is charged into a bin at a central point, the larger granules tend to be concentrated near the bin walls and the smaller granules near the charging point. If the bin is discharged by allowing a central core to pour out first, the finer granules will come out first leaving the coarser granules to come out later.

It is known to suspend a horizontal baffle, often in the form of an upwardly tapered cone, as an insert over the discharge outlet for the purpose of producing a more favorable flow zone. It is known also to assist gravity flow by providing a rotating device, such as one or more plow blades or vanes rotating in a horizontal plane about a fixed axis, between the lower surface of the cone baffle and the discharge opening. Even this arrangement, however, tends to preferentially draw material into one side of the discharge opening while leaving some of the material stationary, thereby leading to pipe flow or funnel flow rather than mass flow.

It is also known that rotary plow devices suffer from the following disadvantages:

1. They cannot feed coarse materials (4 inches to 12 inches in diameter) unless the coarse material is mixed in with finer materials.
2. Large size material will jam or stall the device because the plow blade cannot engage the material.
3. The cutting action of the tip of the plow blade has a tendency to pack or plaster the material into a vertical wall, thus preventing gravity flow of the material.
4. To reach the discharge opening, the material has to travel from the tip of the plow blade, along its arm, to the discharge opening. The long plow blade limits the maximum practical size of the feeder. The drive and all of the components get out of practical proportion. Wet sticky material may cause uneven feeding or no feeding at all. The material ceases to slide along the plow arm; it accumulates and causes a build-up of material, and jams the feeder. The rotary plow was designed to operate on a straight bunker-type shelf because it extracts material from a straight shelf and drops it off the edge.
5. The plow discharge device or feeder is limited to small lever arm applications. The drive becomes impractical. Intermittent blade material engagements cause chattering and extreme flexing. The system becomes clumsy, very uneconomical, and impractical.
6. The rotary plow cannot be used to feed granular material into a high temperature environment.

The present invention provides an improved gravity-assisted discharge or feed arrangement which is capable of maintaining controlled flow of granular material from an upper zone through an opening into a lower zone while avoiding piping, arching and packing of the material. The arrangement also overcomes any particle size segregation of the material which may have occurred during placement of the material in the upper zone. The apparatus employs a horizontally movable pouring means, such as a horizontal plate having one or more apertures therethrough, disposed below a shroud which is disposed within the material, the arrangement being such that granular material does not flush directly from the mass of material through the aperture in the pouring means. However, a quantity or batch of material, which occupies an annular space between the shroud and the plate, resides on a peripheral portion of the plate, and during horizontal movement of the plate a portion of this quantity is displaced inwardly with respect to the shroud. As this occurs and additional quantity of material flows by gravity from the mass into the space formerly occupied by the displaced quantity thereby preventing reverse displacement of the initial quantity. Subsequent movement of the pouring plate causes the pouring aperture to move under the inwardly displaced quantity whereupon this quantity falls through the aperture.

Therefore, the most important feature of the movement of the pouring plate is that a given peripheral portion of the plate will first slide under a quantity of material, then carry at least a portion of that quantity inwardly and then begin to carry it outwardly again. Since outward movement of the displaced material is prevented by the presence of the back-filled material, the plate slides relative to the displaced material so as to bring the pour aperture under the displaced material. In a preferred embodiment the pouring plate is continuously rolled along a circuit path in a horizontal plane so that the pour aperture moves in a circle concentric with the axis of the shroud.

The rolling movement just referred to includes rotation of the pouring plate about its own axis. However, other modes of movement may be employed to achieve a similar or analogous pouring operation. The plate may, for example, be orbited around a fixed vertical axis without rotation of the plate itself. In some instances the plate may be moved linearly back and forth, although this mode of operation will not usually be used when a continuous controlled flow is desired.

The invention will be further understood from the following more detailed description of several illustrative embodiments taken with the drawings in which.

Figure 1:
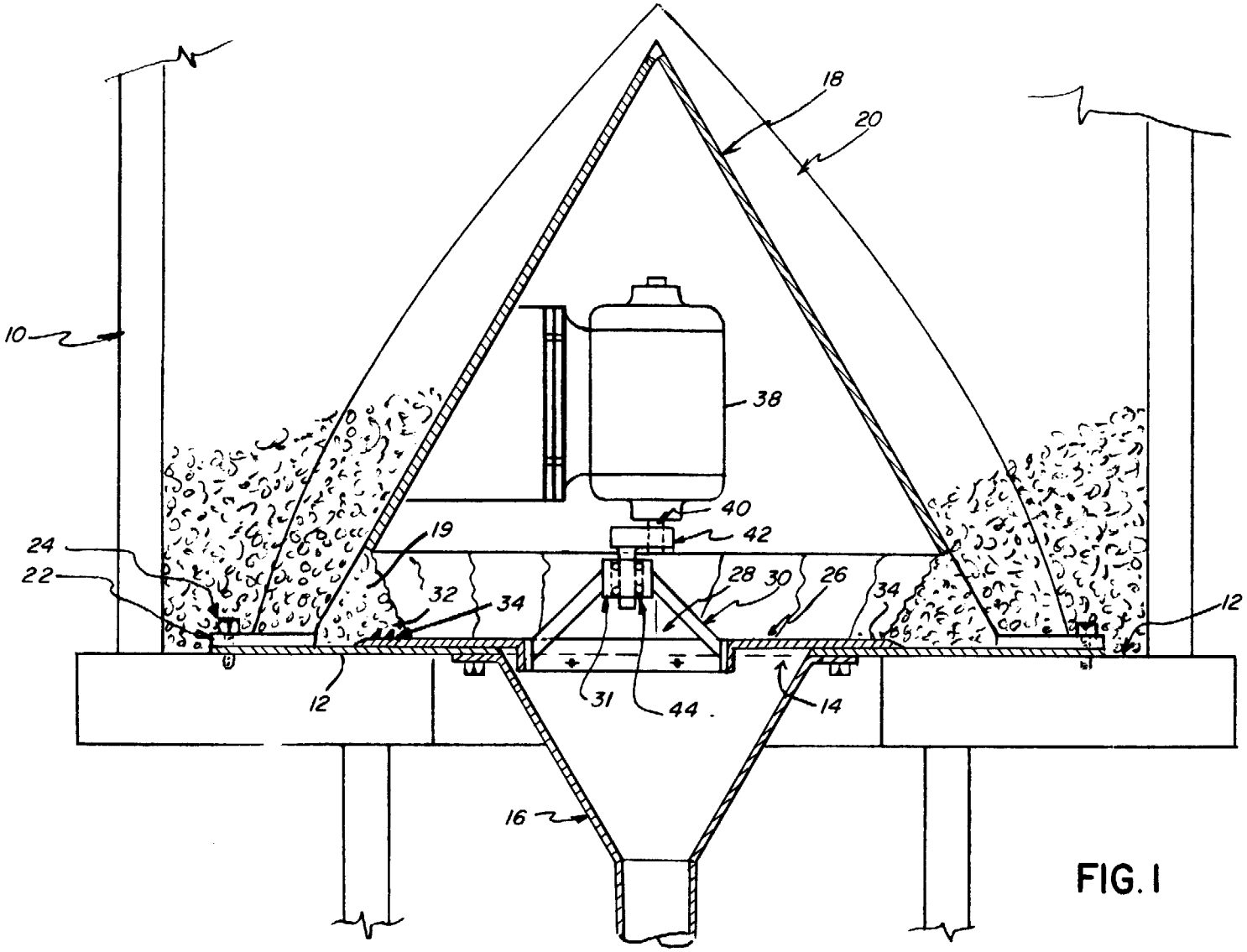
FIG. 1 is a vertical sectional view of a bin discharge arrangement.

Referring to FIG. 1 there is shown the lower end of a vertical cylindrical bin having a side wall 10 and a flat bottom wall 12, the latter being provided with a central discharge opening 14 of substantial size. A downwardly tapered discharge funnel 16 coaxial with the discharge opening 14 projects downwardly from the bottom wall 12.

Above and coaxial with the discharge opening 14 is a shroud 18 in the form of an upwardly tapered conical structure which defines an annular space 19 with the bottom wall 12. A plurality of radial legs 20, in the form of vertical plates, are secured to the exterior of the shroud 18 and support the latter in a fixed position from the bottom wall 12. The lower ends of the legs 20 ar provided with horizontal flanges 22 which are secured to the bottom wall 12 by bolts 24.

Disposed between the lower end of the shroud 18 and the discharge opening 14 and in sliding engagement with the bottom wall 12 is a horizontal disk 26 having a central pour aperture 28 provided with spokes 30 and a central hub 31. The pour aperture 28 is of lesser diameter than the discharge opening 14, and the disk 26 is eccentric with respect to the axis of the opening 14. As a result, the pour aperture 28 is disposed eccentrically with respect to the opening 14.

The disk 26 in this embodiment is rolled along a circular path so that the pour aperture 28 moves in a circle and rotates about its own axis, with the result that material is discharged in the manner previously described. In this way material continuously passes out of the aperture 28 in the form of a hollow cylindrical curtain into the funnel 16. If one considers a given radius of the aperture 28 one will find that the material is sequentially pushed inwardly over the edge of the aperture along this radius. Since the aperture is moving the given radius is moving, and the overall result is that material is continuously being discharged around the periphery of the aperture. As shown in FIG. 1 a quantity 32 of the granular material which resides in the annular space 19 also resides on a peripheral portion of the disk 26 when the latter slides to the left. A portion of this quantity 32 will be subsequently carried inwardly upon further movement of the disk 26. The upper surface of the disk 26 may be provided with one or more upwardly and inwardly directed projections 34 which aid in frictionally engaging the material 32 during inward movement of the disk 26.

The means for rolling the disk 26 is illustrated in FIG. 1 in the form of a variable speed motor 38 disposed within the shroud 18 with its output shaft 49 coaxial with the axis of the discharge opening 14. A horizontal arm 42 is fixed at one end to the output shaft 40, and at its other end it is connected to a knuckle 44 which is loosely retained within the hub 31. The crank-type movement imparted to the disk 26 by the arm 42 is converted to rolling movement due to the friction between the material 32 and the disk 26. It has been found that the torroidal discharge diameter should be about two-thirds of the diameter of the bin.

Figure 2:
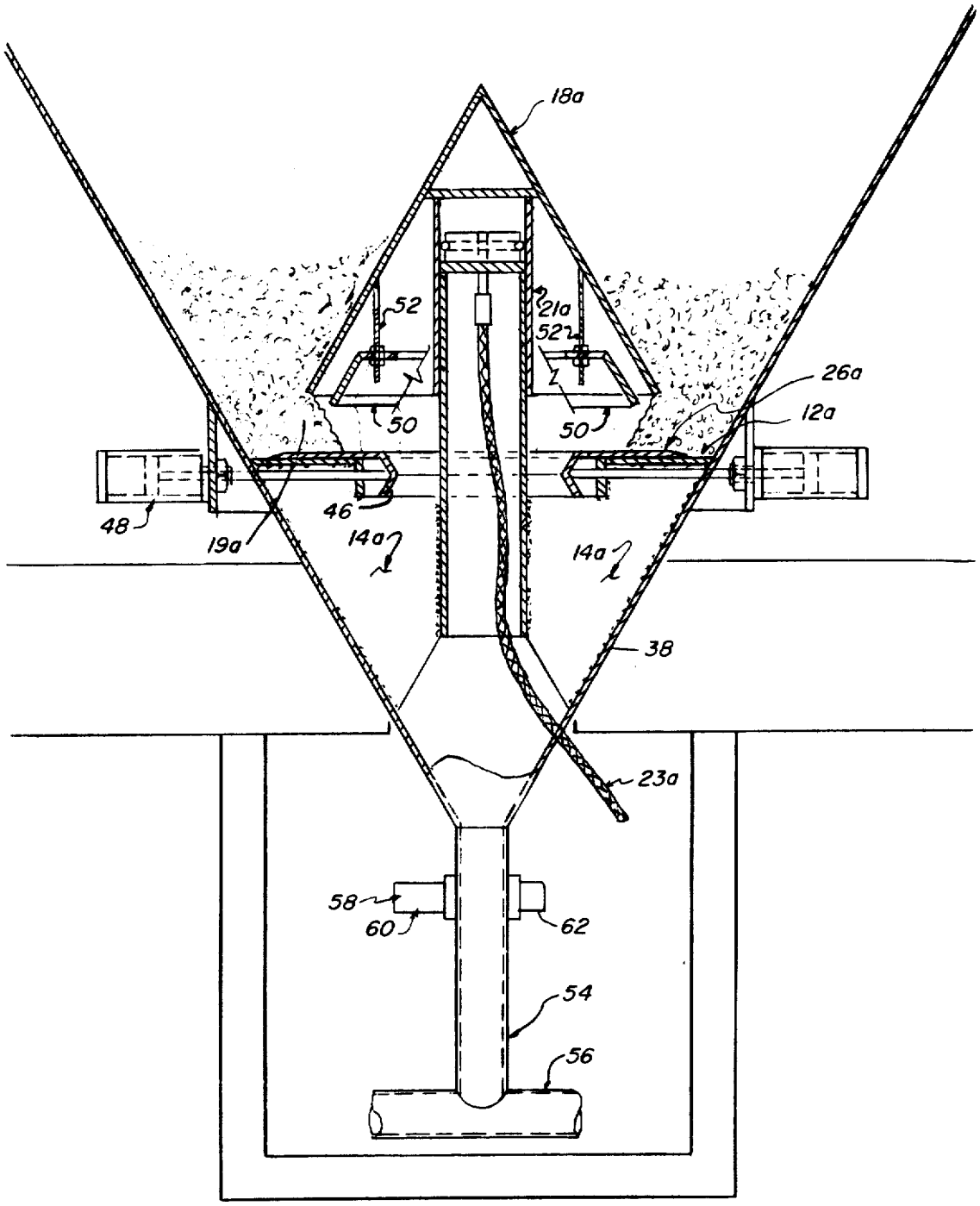
FIG. 2 is a vertical sectional view of another bin discharge arrangement.

FIG. 2 illustrates a somewhat different construction of the means for forming the pour aperture 28a. In this embodiment the horizontal plate 26a is fitted with a downwardly extending funnel-shaped collar 46. The means for rolling the disk 26a is in the form of three radially arranged hydraulic ram units 48 the extension and retraction of which are synchronized to move the disk 26a in a circular path. Web plates 14a with a hydraulic ram 21a support the inverted cone shroud 18a. The hydraulic ram 21a can be raised to change the height of the annular flow space 19a which exits between the lower end of the shroud 18a and the bottom wall 12a of the bin. The hydraulic ram 21a can also be hydraulically pulsed to promote flow of sticky materials. Hydraulic fluid is delivered to the ram 21a through a conduit 23a. The shroud 18a can also be provided with an inner conical section 50 which is vertically adjustable on threaded rods 52. Vertical adjustment of the section 50 also changes the height of the annular flow space which exists between the lower end of the shroud 18a and the bottom wall 12a of the bin.

The lower end of the collar 46 extends into a receiving hopper 38. The lower end of a pipe 54 discharges into a fixed horizontal pneumatic conveyor pipe 56. A conventional gamma gage 58 comprising a source of gamma radiation 60 and a gamma ray detector 62 is fitted to the exterior of the pipe 54 intermediate its ends. After proper calibration of the gage 58 its output signal is a measure of the flow rate of material through the pipe 54. The output signal may be used to control the speed of rotation of the disk 26a to effect changes in flow rate or to maintain constant flow.

Figure 3:
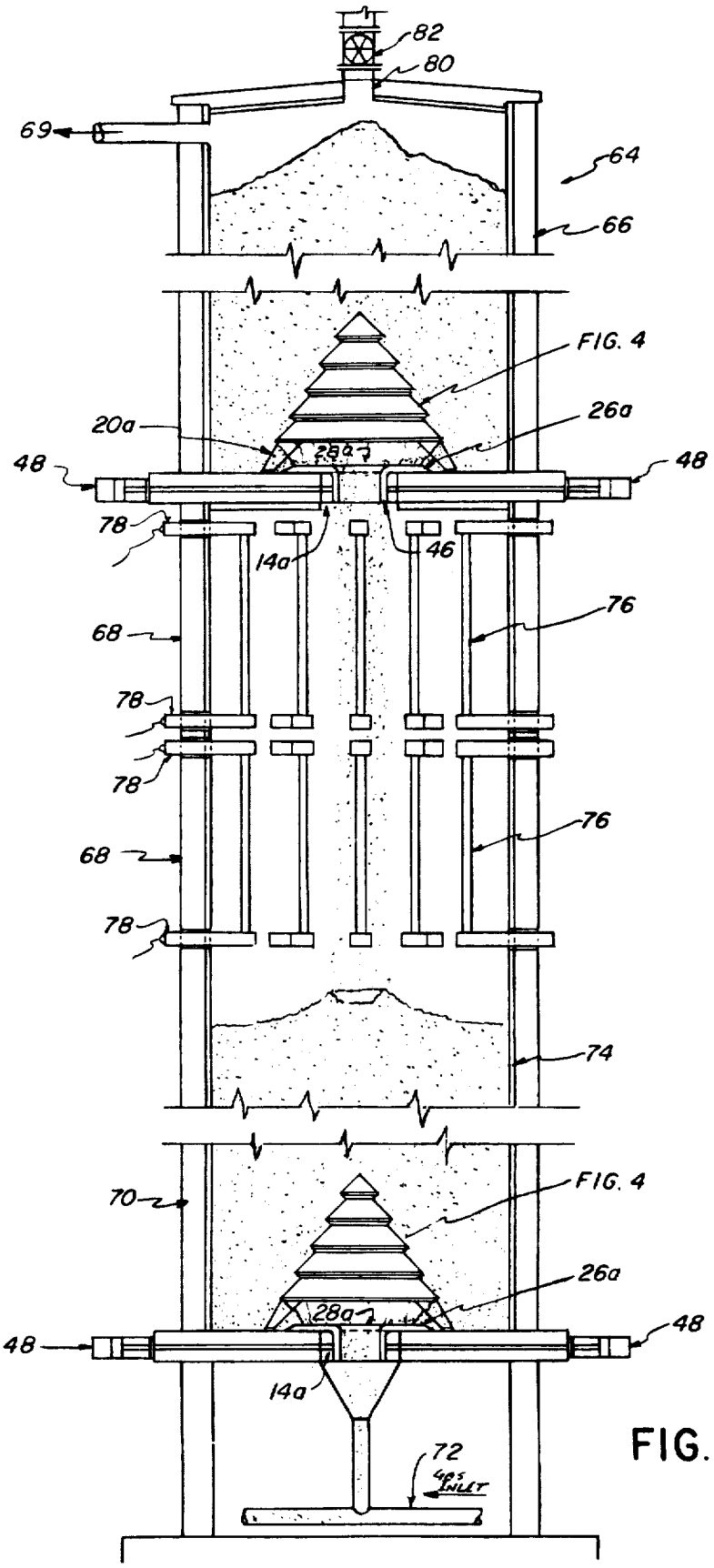
FIG. 3 is a vertical sectional view through a vertical kiln.

FIG. 3 illustrates the use of the novel discharge arrangement in a novel vertical kiln 64 for pyroprocessing granular material. The kiln 64 includes a preheating section 66, a heating section 68 with byproduct effluent gas reclamation port 69 and a cooling section 70. The latter discharges into a pneumatic conveyor line 72.

The heating section 68 is constructed of a cylindrical refractory side wall 74 and a plurality of vertically arranged, spaced-apart resistance heating rods 76 provided with suitable elctrical terminals 78. Granular material falling past the rods 76 becomes heated to, for example, 3,000° F. The cooling section 70 is similar in construction to the pre-heating section 66.

Figure 4:
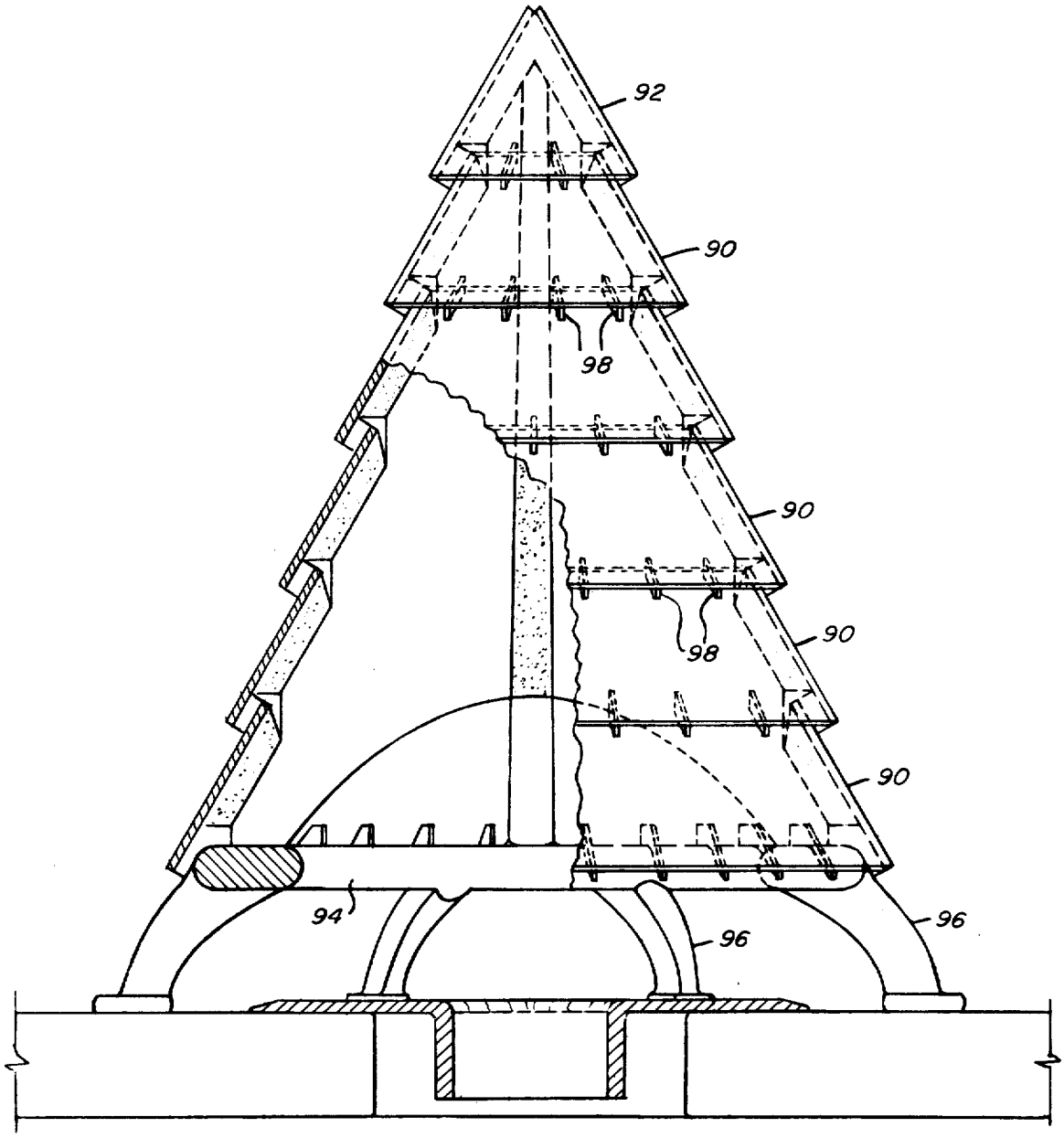
FIG. 4 is a fragmentary view of part of FIG. 3.

Between the section 66 and the heating section 68 and between the cooling section 70 and the conveyor line 72 is a feeding device similar to that illustrated in FIG. 3, and the reference numerals employed in FIG. 3 designate the same elements in FIG. 4.

In operation of the kiln 64 granular material is charged into the pre-heating section 66 through a feed inlet 80 provided with conventional rotary air lock feeder valves 82. Upon operation of the upper feeding device by the rams 48 material passes through the discharge opening in the bottom of the section 66 and falls freely between and among the heating rods 76 so as to collect in a large mass on the bottom wall of the cooling section 70. The size of the collected mass is maintained more or less constant by the lower feeding device which feeds the material into the conveyor line 72.

FIG. 4 illustrates more in detail the shroud portion of the feeding devices of FIG. 3. As shown, the shroud is made up of a plurality of frusto-conical ring sections 90 of decreasing diameter stacked one on top of another with a closed conical section 92 at the upper end. The lower end of the stack rests on an annular support ring 94 which is provided with downwardly projecting legs 96. Spacer members 98 hold the sections 92 in spaced-apart relationship so that hot gases can pass through the shroud and permeate and preheat the material above and around the shroud. The sections 92 may be constructed of ceramic material and the support ring 94 may be constructed of cast iron.

Figure 5:
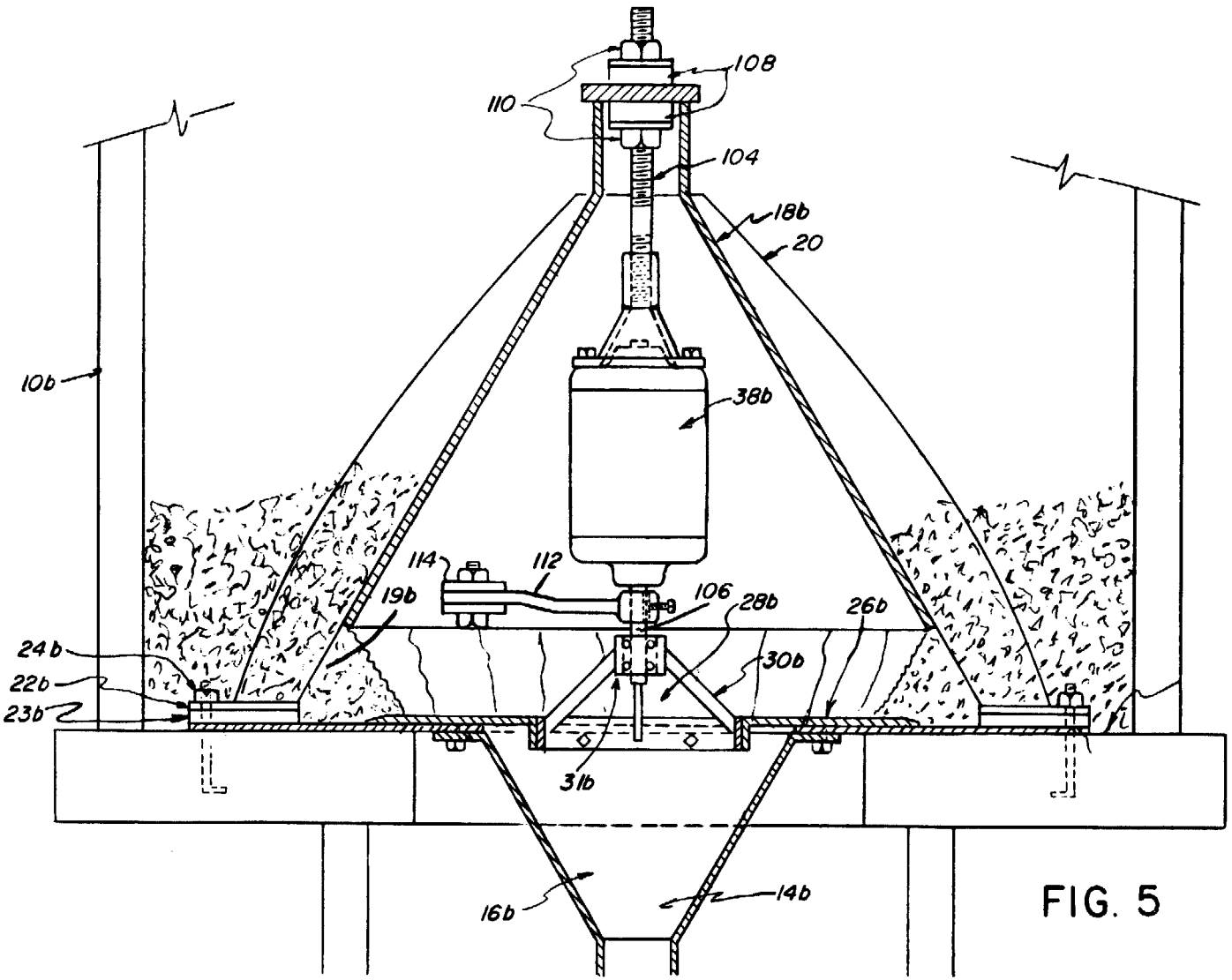
FIG. 5 is a vertical sectional view of a further form of rotary drive for the discharge arrangement.

It will be appreciated that any of several forms of drives for rolling the pouring plate of the invention may be used. FIG. 5 illustrates a drive in which a motor 38b is suspended by a non-rotating shaft 104 from the upper end of a shroud 18b in a manner such that the motor housing means stationary while the shaft 106 rotates. The upper end of the non-rotating shaft 104 is mounted by means of rubber grommets 108 clamped between retaining nuts 110 so that the motor 38b and shaft 104 can oscillate. A lateral arm 112 is fixed at one end to the rotating shaft 106 and carries a weight 114 at its outer end. Upon operation of the motor the shaft 106 rotates, and the weight 114 causes the entire motor and the shaft 106 to swing in a circular path. The lower end of the shaft 106 loosely fits in the hub 31b of the pour plate 26b so that the latter moves in a circular rolling path to effect discharge of material in the manner previously described. Rotation of the plate 26b about the shaft 106 results from the interaction of the circular swinging movement with the frictional forces between the periphery of the plate 26b and the granular material in the annular space 19b.

Figure 6:
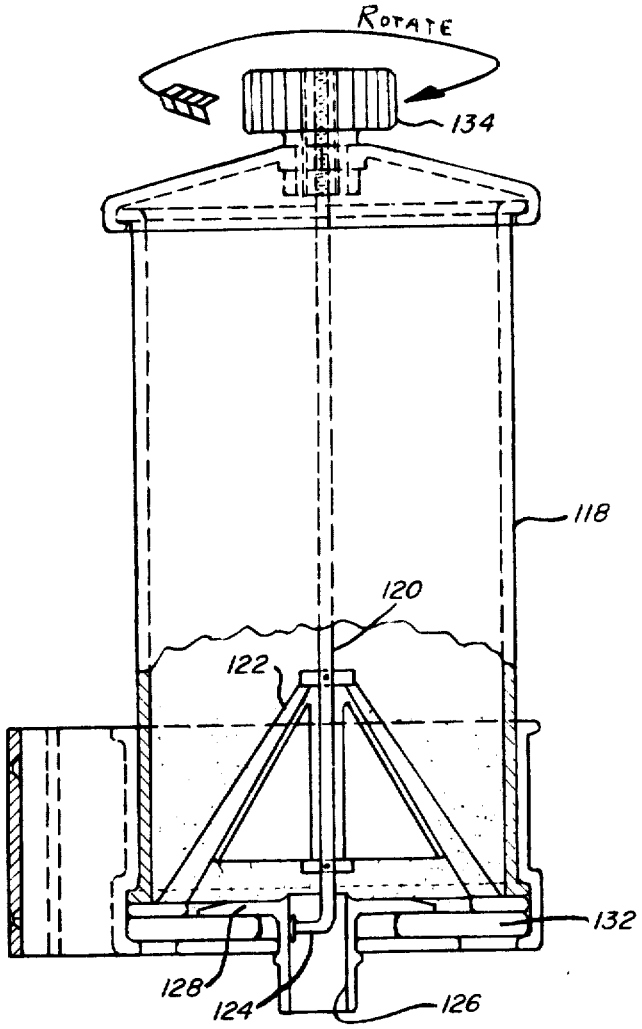
FIG. 6 is a vertical sectional view of yet another form of rotary drive.

FIG. 6 illustrates yet another form of rotary drive. In the embodiment the upper zone is constituted by a small cylindrical container 118 from which granular solids may be dispensed by manually operating the drive. A central vertical shaft 120 extends downwardly through a shroud 122 and is provided at its lower end with a short lateral arm 124. The outer end of the arm 124 engages the periphery of a central circular pour aperture 126 in a circular pour plate 128. The plate 128 is eccentric with respect to the axis of the shaft 120 and is horizontally movable within a circular opening 130 in the bottom wall 132 of the container 118. The upper end of the shaft 120 is provided exteriorly of the container 118 with a thumb knob 134 by means of which the shaft 120 may be rotated. Rotation of the shaft 120 causes the plate 128 to roll in a circular path to cause discharge of material in the manner previously described.

Figure 7:
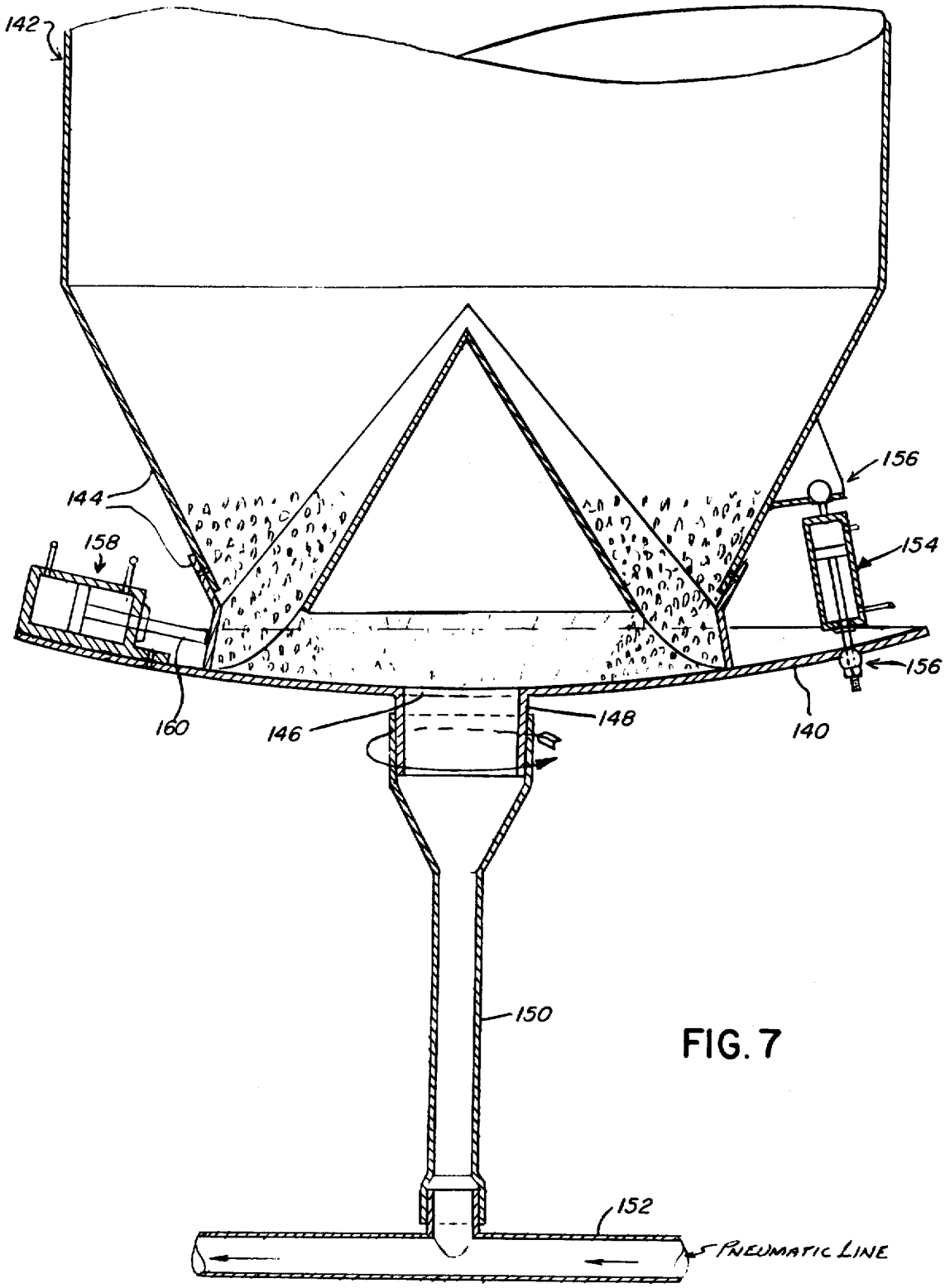
FIG. 7 is a vertical sectional view of a further form of discharge arrangement.

FIG. 7 discloses an arrangement in which a pour plate 140 forms the bottom wall of a vessel 142. As shown, the pour plate 140 is an upwardly concave plate which slidably engages the lower edge of the cylindrical side wall 144. A central pour aperture 146 is surrounded by a depending pipe section 148 which is connected to the upper end of a flexible conduit 150. The lower end of the flexible conduit connects with a fixed pneumatic conveyor pipe 152.

The plate 140 is held against the lower edge of the vessel side wall 144 by any suitable means which will permit orbital movement of the plate 140 relative to the vessel. The holding means may be a plurality of hydraulic rams, one of which is shown at 154, connected to the vessel 142 and to the plate 140 by ball joints 156. Orbital movement of the plate 140, without rotation thereof about its own axis, may be effected in any suitable way, as by means of hydraulic rams 158 carried by the plate 140 and being synchronized such that their piston rods 160 push against the cylindrical side wall 144 to impart the desired motion to the plate 140.

Figure 8:
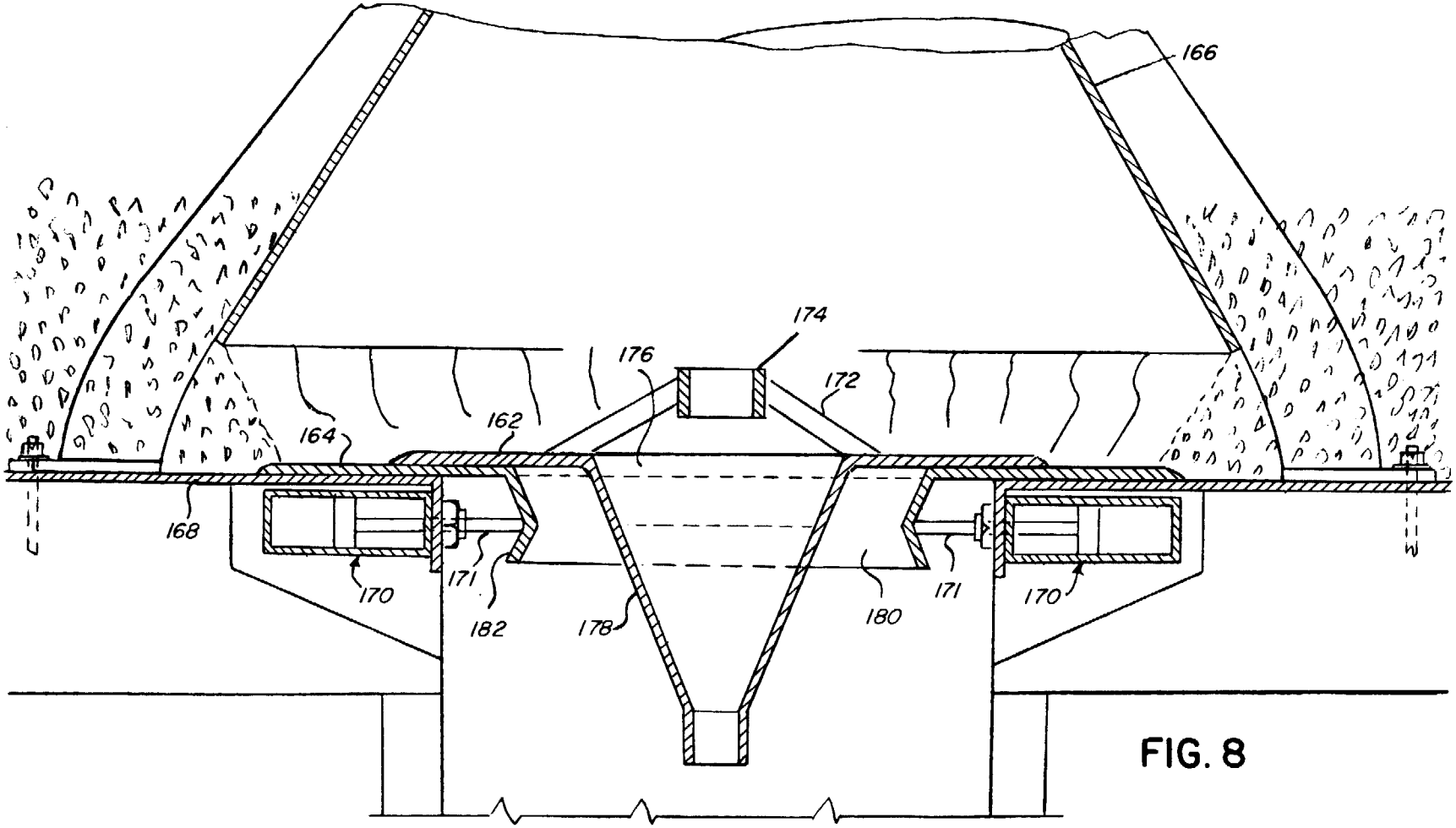
FIG. 8 is a vertical sectional view of a further form of discharge arrangement.

FIG. 8 illustrates an embodiment which combines some of the features of FIGS. 1 and 2. In this embodiment there is an upper pour plate 162 and a lower pour plate 164 each of which is given a rolling motion concentric with the circumference of a conical shroud 166. The lower plate 164 slides on the bottom wall 168 of the bin and is acted on by hydraulic rams 170 in the same manner as the pour plate of FIG. 2. The upper pour plate 162, which is of lesser diameter than the lower plate 164, includes spokes 172 and a hub 174 which is acted on by a crank arm (not shown) in the same manner as the pour plate of FIG. 1. The pour aperture 176 of the upper plate is fitted with a depending funnel-like structure 178 which protrudes through an aperture 180 in the lower plate 164.

In operation of the FIG. 8 arrangement the lower pour plate 164 feeds material inwardly from the annular space defined between the lower end of the shroud 166 and the bottom wall 168 in the manner previously described. In the same manner the upper pour plate 162 then picks up this material and feeds it inwardly so that it will discharge around the edge of the aperture 176.

With respect to the motion imparted to the plate 164 by the rams 170 it will be understood that the ends of the piston rods 171 are engageable with an outer periphery of the collar 182 but are not connected to the collar 182. The piston rods push linearly against the collar 182 in sequence to impart orbital movement to the latter. Rotation of the plate 164 and collar 182 about the axis of the aperture 180 as a result of frictional forces on the plate 164 produces relative sliding movement between the collar 182 and the ends of the piston rods.

It will be understood that the vertical distance between the shroud and the pouring means in this invention will depend on several variable includes the nature of the granular material, the size of the pour aperture and the diameter of the circular path of the pour plate. The relationships must always be such that the granular material will not flush by gravity from the mass of material directly through the pour aperture. That is, when the pour aperture is stationary, no discharge occurs.

What is claimed is:

1. Apparatus for conveying granular material by gravity assist from an upper zone containing a mass of the material *downwardly through a vertically facing discharge opening in a horizontal wall* into a lower zone at a controlled flow rate comprising: a fixed shroud which is symmetrical about a vertical axis passing through the shroud and having its lower end disposed within the mass of material *and directly above the vertically facing discharge opening;* a horizontal annular plate having an aperture therethrough located directly below the lower end of the shroud *and above the discharge opening, said annular plate engaging and being supported by said horizontal wall* in a position such that an annularly shaped quantity of granular material formed below the shroud resides on the upper surface of said plate; and means for orbiting said plate *relative to said discharge opening* about the vertical axis of the fixed shroud so that granular material is urged inwardly from the annularly shaped quantity of material and over the edge of the aperture in said annular plate along a path which continuously moves around the periphery of the aperture.

2. Apparatus as in claim 1 including means for simultaneously rotating said plate about the axis of said aperture.

3. Apparatus as in claim 1 wherein there are upper and lower horizontal annular plates, each of said plates having an aperture which is registrable with an aperture in the other plate.

[4. Apparatus as in claim 1 including a vessel having side walls, said plate forming a bottom wall of the vessel and being in sliding sealing engagement with the lower edges of said side walls.]

5. A method for discharging granular material by gravity assist from an upper zone containing an annular mass of the granular material which is disposed below a fixed shroud *and above a wall having a vertically facing discharge opening* said method comprising disposing a horizontal annular plate below the shroud *and supporting the plate on said wall* in a position such that granular material in the annular mass thereof resides on the upper surface of the plate and orbiting the plate in a horizontal plane *relative to said discharge opening* in a manner to urge granular material from the annular mass thereof inwardly to the periphery of the aperture in the plate along a path which moves in a horizontal plane around the periphery of the aperture.

6. A method as in claim 5 including simultaneously rotating the plate about the axis of the aperture.

7. Apparatus for discharging granular material by gravity assist from an upper zone containing a mass of the material and feeding the material into a lower zone at a controlled flow rate comprising: *a wall having a vertically facing discharge opening through which the upper and lower zones are in communication;* a shroud *disposed above the discharge opening and* having its lower end disposed within the mass of material; pouring means disposed below the shroud so as to form a generally annular space therewith, said pouring means *being supported on said wall and* including at least one pouring aperture disposed below the shroud *and above the discharge opening,* the pouring means, the pouring aperture and the shroud being sized and arranged such that a quantity of granular material with the aid of gravity resides on a peripheral portion of the upper surface of the pouring means within said annular space and such that granular material does not flush by gravity from the mass of material through the annular space into the pouring aperture; and means for traversing the pouring aperture *relative to the discharge opening* in a generally horizontal path such that it rolls in a circular path concentric with the shroud and such that at least a portion of the quantity of material residing on the upper surface of the pouring means is first displaced inwardly with respect to the shroud whereupon additional material flows by gravity from the mass into the space formerly occupied by said quantity of material and such that the pouring aperture subsequently moves under the displaced portion to thereby discharge the displaced portion through the pouring aperture *and the discharge opening.*

8. Apparatus for discharging granular material by gravity assist from an upper zone containing a mass of the material and feeding the material into a lower zone at a controlled flow rate comprising: *a wall having a vertically facing discharge opening through which the upper and lower zone are in communication;* a shroud *disposed above the discharge opening and* having its lower end disposed within the mass of material; pouring means disposed below the shroud so as to form a generally annular space therewith, said pouring means *being supported on said wall and* including at least one pouring aperture disposed below the shroud *and above the discharge opening,* the pouring means, the pouring aperture and the shroud being sized and arranged such that a quantity of granular material with the aid of gravity resides on a peripheral portion of the upper surface of the pouring means within said annular space and such that granular material does not flush by gravity from the mass of material through the annular space into the pouring aperture; and means for traversing the pouring aperture *relative to the discharge opening* in a generally horizontal orbital path about the vertical axis of the shroud, without rotating the aperture itself, such that at least a portion of the quantity of material residing on the upper surface of the pouring means is first displaced inwardly with respect to the shroud whereupon additional material flows by gravity from the mass into the space formerly occupied by said quantity of material and such that the pouring aperture subsequently moves under the disposed portion to thereby discharge the displaced portion through the pouring aperture *and the discharge opening.*

9. Apparatus for discharging granular material by gravity assist from an upper zone containing a mass of the material and feeding the material into a lower zone at a controlled flow rate comprising: *a wall having a vertically facing discharge opening through which the upper and lower zones are in communication;* a fixed shroud *disposed above the discharge opening and* having its lower end disposed within the mass of material; pouring means disposed below the shroud so as to form a generally annular space therewith, said pouring means *being supported on said wall and* including a movable upper plate overlying a movable lower plate, each of said plates having at least one aperture registrable with an aperture in the other plate so as to form a pouring aperture disposed below the shroud *and above the discharge opening,* the pouring means, the pouring aperture and the shroud being sized and arranged such that a quantity of granular material with the aid of gravity resides on a peripheral portion of the upper surface of the pouring means within said annular space and such that granular material does not flush by gravity from the mass of material through the annular space into the pouring aperture; and means for transversing the pouring aperture *relative to the discharge opening* in a generally horizontal path such that at least a portion of the quantity of material residing on the upper surface of the pouring means is first displaced inwardly with respect to the shroud whereupon additional material flows by gravity from the mass into the space formly occupied by said quantity of material and such that the pouring aperture subsequently moves under the displaced portion to thereby discharge the displaced portion through the pouring aperture.

*10. Apparatus for conveying granular material by gravity assist from a mass thereof supported on a horizontal wall provided with a discharge opening, said apparatus comprising: a shroud disposed above the discharge opening with at least the lower end of the shroud being disposed within the mass of material; a plate disposed between said shroud and said discharge opening, said plate being of smaller horizontal dimensions than said bottom wall and having at least one vertically facing aperture in register with the discharge opening; and means for orbiting said plate about a vertical axis in a manner such that the aperture in said plate remains in register with the discharge opening and such that a peripheral portion of the plate will slide under a quantity of material and then carry at least a portion of that quantity inwardly toward said aperture whereby material con-*

*tinuously flows inwardly to said aperture along a path which moves around the periphery of said aperture.*

*11. Apparatus as in claim 10 including means for simultaneously rotating said plate about the axis of said aperture.*

*12. Apparatus as in claim 10 wherein there are upper and lower plates each of which has an aperture which is registrable with an aperture in the other plate.*

*13. Apparatus as in claim 10 wherein said horizontal wall is the bottom wall of a container having an upright side wall.*

*14. Apparatus as in claim 10 wherein the lower surface of said plate slidably engages the upper surface of said horizontal wall.*

*15. Apparatus as in claim 10 wherein the horizontal dimension of said plate is less than the horizontal dimension of said shroud.*

*16. Apparatus as in claim 10 wherein the horizontal dimension of said plate is greater than the horizontal dimension of said shroud.*

* * * * *